UNITED STATES PATENT OFFICE.

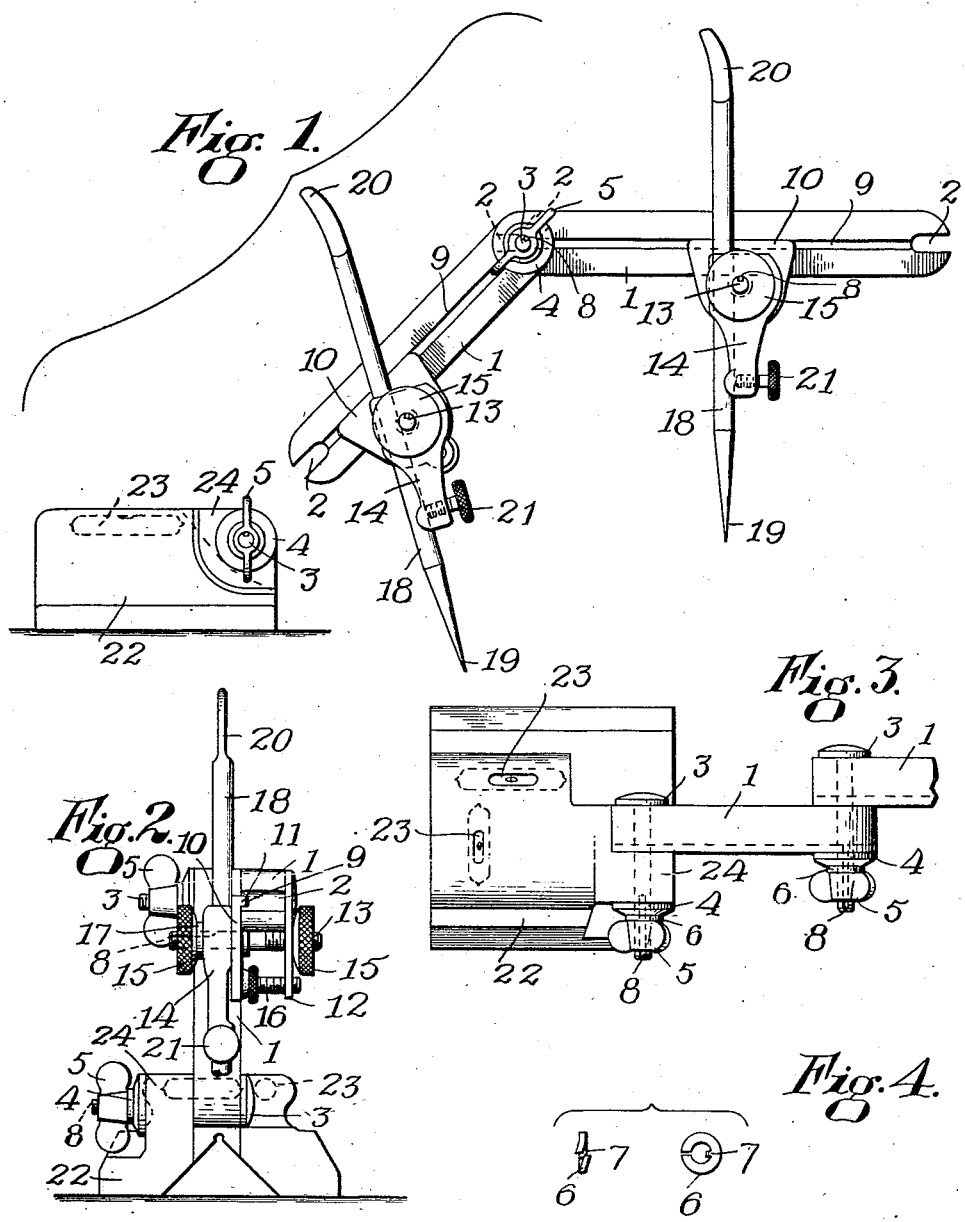
H. T. HANSSON.
COMBINATION TOOL FOR MEASURING AND LAYING OUT MACHINE WORK.
APPLICATION FILED JUNE 8, 1916.
1,285,692. Patented Nov. 26, 1918.
Inventor
Herman T. Hansson
By Geo. H. Kennedy Jr.
Attorney

HERMAN T. HANSSON, OF MILLBURY, MASSACHUSETTS.

COMBINATION-TOOL FOR MEASURING AND LAYING OUT MACHINE-WORK.

1,285,692.  Specification of Letters Patent.  Patented Nov. 26, 1918.

Application filed June 8, 1916. Serial No. 102,574.

*To all whom it may concern:*

Be it known that I, HERMAN T. HANSSON, a subject of the King of Sweden, residing at Millbury, in the county of Worcester and Commonwealth of Massachusetts, United States of America, have invented a new and useful Improvement in Combination-Tools for Measuring and Laying Out Machine-Work, of which the following, together with the accompanying drawings, is a specification.

The present invention relates to instrumentalities such as are employed in machine shop practice for measuring, gaging, marking and laying out the work to be operated upon. The invention consists of a novel assemblage of parts, which coöperate each with the others in facilitating particularly the laying out of various kinds of work which are not susceptible to laying out by the tools and appliances now in ordinary use, except by the most involved and laborious methods.

The novel features of the invention, and the uses to which it is particularly applicable are set forth in the following description, reference being had therein to the accompanying drawings showing the preferred form of the invention, and in which drawings—

Figure 1 is a side elevation of the assemblage of parts most commonly used, and showing also a base adapted for attachment thereto, when desired.

Fig. 2 is an end elevation of the parts when the device is employed on a surface gage.

Fig. 3 is a top plan view of the parts shown in Fig. 2, one end thereof being broken off.

Fig. 4 shows a tension washer of special formation used in assembling the parts.

Similar reference characters refer to similar parts in the different figures.

My invention provides a plurality of bars 1, 1, preferably of some light material such as wood, said bars being rounded at their ends, which have longitudinal slots or notches 2, 2 cut therein. Any suitable number of these bars 1, 1 is contemplated, and they may be provided in a variety of lengths, to afford a wide range of selection, both as to number of bars and length of bars to be used for any given purpose. The bars 1, 1 are adapted to be joined together at their ends for angular adjustment each with respect to the adjacent bar, to form a rigid structure of the desired shape; as shown in Fig. 1, two bars 1. 1 are used, but obviously any greater number may be employed, if the character of the work demands a structure with more angles or of greater length.

The bars are joined together by bringing the end slots 2, 2 of adjacent bars into matching relation, for the insertion therethrough of a headed screw or bolt 3. A washer 4 is used on the projecting screw threaded end of bolt 3, being pressed against the side of bar 1 by a thumb nut 5, between which and the washer 4 a tension washer 6 is interposed. Each tension washer 6 has an interior lug 7, received within a groove 8 in the associated bolt 3, whereby the rotation of the thumb nut 5 is not communicated to the washer 6 and the bars 1, 1, and thus any given adjustment of the latter is not disturbed by the tightening or loosening of the thumb nut 5, the engagement of the lug 7 with the groove 8 serving to hold the washer in position and thus cause it to exert a constant tension against the bars 1, 1.

Each bar 1, 1 is provided in one face with a longitudinal groove 9, extending the entire length thereof. For coöperation with the grooves 9 of as many bars as may be desired, jaws 10 are provided with laterally extending lugs 11, fitting in said grooves and capable of a sliding movement along the bar. On the other side of the bar from the jaw 10, a jaw 12 is adapted to be used, the same providing, in conjunction with the jaw 10, a support for a bolt or screw 13 which passes through the two jaws just below the lower edge of the bar 1. The bolt 13 affords a pivotal support for a scriber-socket 14, as hereinafter more particularly described; thumb screws 15, 15 are carried on the ends of a bolt 13 to maintain the same against longitudinal movement. A counterscrew 16 is received within a threaded hole of the jaw 12, and the other end of said screw is capable of rotation in a support therefor provided for by the jaw 10. As a result, the counterscrew 16, when rotated, acts to spread the lower ends of the jaws 10 and 12 apart, thereby causing the other ends to bind upon the sides of the bar 1, to maintain the jaw structure and the scriber-socket carried thereby at any desired position of adjustment in the length of the bar 1.

The scriber-socket 14, which is pivoted upon the bolt 13, is therefore capable of angular adjustment with respect to the jaws 10 and 12. Interposed between the scriber-socket 14 and the adjacent thumb screw 15 is a tension washer 17, of the same form and construction as the tension washer 6 heretofore described. The interior lug of said washer engages in a groove of the bolt 13, as shown in the dotted lines Fig. 2, and thus maintains the scriber-socket 14 in any desired position of angular adjustment, as described in connection with the tension washer 6 and bars 1, 1 above. Each adjustable scriber-socket 14 is provided with a hole to receive a member 18, one end of which has a sharp marking point 19 and the other end of which is curved and flattened, as at 20, to afford a shape suitable for caliper measurements. The lower end of each scriber-socket 14 carries an adjustment screw 21, the end of which bears against the member 18 to hold the latter in adjusted position. It is obvious that a rapid and accurate adjustment of the member 18 can be obtained in this manner by slightly springing said member past the end of the screw 21.

As shown assembled in Fig. 1, the parts present a structure capable of universal adjustment, and capable of being rigidly secured in any desired position of adjustment. The scribing and calipering devices can be moved longitudinally to any position on the associated bars 1, and held in such position; the bars 1 can be held in any desired relative angular position, and obviously one or more intermediate bars 1 can be interposed between the bars which carry the scribing and calipering devices, to provide a rigid and adjustable structure in which the coöperating ends of the two members 18 are capable of being disposed in any desired relation. Furthermore, the inclination of the members 18 with respect to their associated bars 1 can be varied at will, the pivotal support of the scriber-sockets 14 on the bolts 13 permitting any and all angular positions of the members 18 to be attained; and finally by adjustment of the members 18 in the sockets any desired position of either ends of the members 18 with respect to the bars 1 may be attained. Such an assemblage of parts, providing ready adjustment in all directions, and permitting the widest latitude in respect to the relative disposition and distance apart of the measuring, marking and calipering devices, results in a structure peculiarly adapted to the laying out of various classes of work which present serious obstacles to the tools and appliances now in use for this purpose. For instance, it is obvious that an angular arrangement of bars 1, 1 may be readily resorted to for the purpose of transferring a center line from one surface of a piece of work to another surface, when an irregular and unfinished corner is, as often times happens, interposed between said surfaces. Furthermore, the above or a similar arrangement of parts may be utilized on work such as the upper and lower halves of shaft bearings, to transfer and locate the center of the bearing upon the base or other remote surface thereof.

Other and further advantages of a structure of this type will readily suggest themselves, it being clear that the possibility of obtaining any irregular outline by means of the adjustable bars 1 and the universal adjustment of the members 18, adapts the tool especially to the transfer of points and lines from one surface or location to any and all other surfaces of the object which is being operated upon, irrespective and regardless of intervening corners, projections, depressions and the like. Furthermore, the flexibility of the structure, by the use of any desired number of bars 1, adapts it to the calipering of shafts and bearings of large diameter, such as would not be capable of measurement by the ordinary size tools now in use.

When desired, the structure may be used as a surface gage, in connection with a base 22, Fig. 1, which base is provided with the usual spirit levels 23, 23. The base 22 has an upstanding projection 24, with respect to which the end of a bar 1 may be pivoted, and one of the bolts 3, previously described, may be used, in connection with a washer 4, tension washer 6 and thumb nut 5, to provide an adjustable pivotal support for the structure with respect to the base, the slot 2 in the end of bar 1 being utilized for this purpose. This assemblage of parts is illustrated in Figs. 2 and 3, it being obvious that in this instance only one set of measuring, marking and calipering devices is employed, although, of course, any necessary number of bars 1 may be interposed between these devices and the base.

I claim,

1. In a device of the class described, a series of bars having notches at their ends, clamping means passing through said notches, each of said bars having on one side a longitudinal groove, a pair of jaws gripping opposite sides of each bar, one jaw of each pair slidably engaging said groove, means for clamping said jaws against said bars, a socket pivotally connected to one of said jaws and a scriber tool held in said socket.

2. In a device of the class described, a series of bars pivotally united to each other and each having a longitudinal groove, a pair of jaws gripping opposite sides of each bar, one jaw of each pair slidably engaging said groove, means for clamping the jaws together, and means for pressing their edges against said bars, a socket pivotally connected to one of said jaws, means for applying a frictional resistance to the angular movement of said socket, and a scriber tool held in said socket.

3. In a device of the class described, a series of grooved bars pivotally united, a base supporting one of said bars, a pair of jaws gripping opposite sides of one of said bars, one of said jaws slidably engaging the groove of said bar, a clamping bolt uniting said jaws outside of said bar, means outside of said bar for crowding the edges of said jaws against the bar, a socket pivotally attached to said clamping bolt, and means for frictionally restraining the angular movement of said socket.

4. In a device of the class described, a series of grooved bars pivotally united, a pair of jaws slidably engaging a groove in one of said bars, a socket pivotally connected to one of said jaws, a scriber tool carried by said socket, and a screw carried by said socket and bearing against said scriber tool.

HERMAN T. HANSSON.

Witnesses:
NELLIE WHALEN,
PENELOPE COMBERBACH.

Copies of this patent may be obtained for five cents each, by addressing the "Commissioner of Patents, Washington, D. C."